E. A. JACOBSON.
THRUST BEARING.
APPLICATION FILED APR. 8, 1919.
1,323,769.
Patented Dec. 2, 1919.
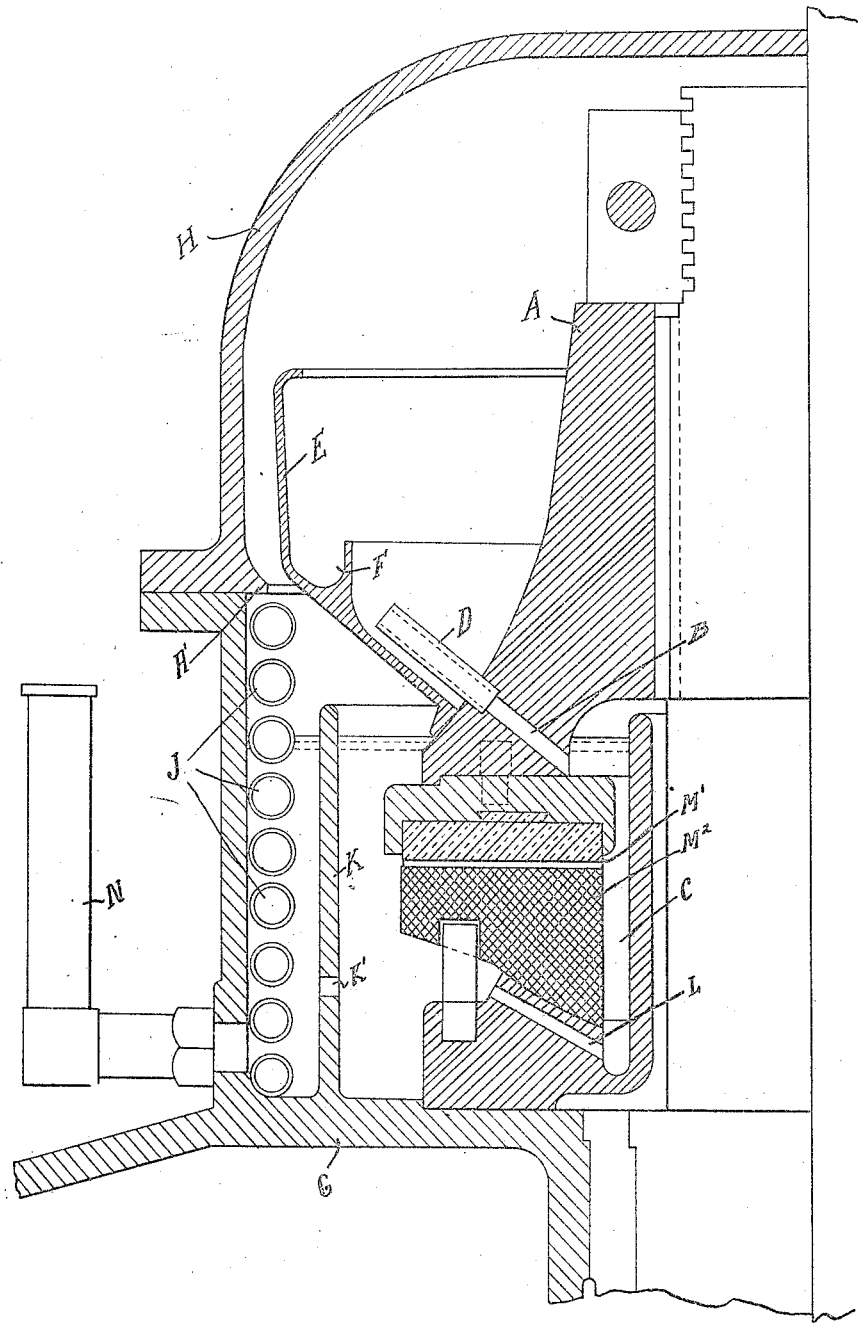
INVENTOR
Eric A. Jacobson
BY
ATTORNEY

UNITED STATES PATENT OFFICE.

ERIC ANTON JACOBSON, OF LINDSAY, ONTARIO, CANADA.

THRUST-BEARING.

1,323,769.      Specification of Letters Patent.      Patented Dec. 2, 1919.

Application filed April 8, 1919. Serial No. 288,535.

*To all whom it may concern:*

Be it known that I, ERIC A. JACOBSON, a citizen of the Dominion of Canada, residing at Lindsay, in the county of Victoria and Province of Ontario, Canada, have invented certain new and useful Improvements in Thrust-Bearings, of which the following is a specification.

This invention relates to improvements in thrust bearings consisting of a lubricating means designed to increase the oil circulation.

A further object is to provide a means whereby centrifugal action will draw the oil from around the bearings and cause it to circulate over cooling coils so as to increase the heat radiation.

With these and other objects in view, the invention consists in the construction, combination and arrangement of parts as will be hereinafter fully described, illustrated in the accompanying drawing and pointed out in the claims hereunto appended.

In the drawings:

A is a sleeve collar which may be suitably attached to any shaft. B is a radial orifice which extends from the outer face of the sleeve collar A to the inner face of the same thus forming a discharge opening from the inner chamber C. D is a pipe extension which may be inserted in the outer end of orifice B if the circulation of the oil is to be further increased over that caused by the centrifugal action of the sleeve collar without this extension D.

E is a rotatable disk which rotates in connection with the sleeve A. This disk is provided with an annular cup-shaped groove F on its inner side. In the drawing I show by a narrow line the direction of the flow of the oil. It will be noticed that the discharge from the extension D will strike the inner side of the cup-shaped groove F, then after passing over the groove F it will follow upwardly over the top of the disk E. While passing over the groove F and before striking the upper edge of the disk E, any foreign matter which might be in the oil will drop into the groove F and may be removed when the machine is stopped.

G is the housing around the bearing and is provided with a cap H. After the oil reaches the top of the disk E it will be drawn against the cap H and follow the inner side of this cap H downwardly due to gravity.

J indicates a series of cooling coils suitably arranged inside the housing G so that the oil after running down the inner side of the cap H and over the lip H¹ drops on the top of the series of cooling coils J which extend above the oil level in the oil bath.

K is a concentric wall formed as a part of the housing G and is provided with suitable ports K¹ near its lower portion. The oil from around the cooling collars J, after being cooled, is drawn through the ports K¹ and reënters the inner chamber C by means of an opening L.

Before passing through the ports K¹ any foreign matter that may be in the oil will be allowed to deposit in the lower part of this outer chamber in which the cooling coils are situated.

A further flow of oil is noted by the double arrow line. This flow passes from the inner chamber C and out between the rubbing surfaces M¹ and M², it then returns through the opening L to the inner chamber C.

N is the oil intake pipe suitably connected with the housing G.

From the foregoing it is thought that the construction of my invention will be clearly understood, and therefore a more extended explanation has been omitted.

What I claim as new, is,—

1. A thrust bearing consisting of a sleeve collar suitably positioned on a shaft, a disk suitably positioned on said collar, a housing provided with a suitable member whose upper face acts as a rubbing surface with the lower portion of said collar, a concentric wall extending upwardly from the base of said housing and having suitable intake ports, a cooling coil suitably arranged between said wall and the outer wall of said housing, an orifice formed radially in the side of the said collar through which oil is drawn due to centrifugal action and discharged on said disk where it will overflow at the upper edge in a thin film striking the cap portion of said housing over which it flows downwardly due to gravity and is passed over said cooling coils.

2. A thrust bearing consisting of a housing having a suitable cap, a sleeve collar mounted on a shaft and adapted to rotate inside said housing, a disk positioned on said sleeve collar, said disk having an annular up-turned groove on its inner face and its outer wall bent inwardly at the top, said sleeve having a radial orifice near its lower end, a tube extension adapted to engage in the outer end of said orifice, said housing having a concentric wall extending upwardly from its base, said wall having suitable intake ports, a series of cooling coils suitably arranged between said wall and the outer wall of said housing, a rubbing block suitably positioned in said housing so that the lower portion of said collar acts as a rubbing surface thereon, an inner wall positioned inwardly from said rubbing block, an intake orifice in said block and an intake connection engaged at the outside of said housing.

3. A thrust bearing consisting of a sleeve collar provided with suitable rubbing surface at its lower end, said collar being suitably positioned on a shaft, a disk rotatably mounted on said collar, a housing covering the lower portion of said sleeve and said disk and a cap suitably engaged with said housing and covering the upper portions of said collar and said disk, said housing being provided with an upwardly extending concentric wall and a rubbing block having an upwardly extending wall attached at its lower inner end, suitable cooling coils between said concentric wall and the outer wall of said housing, an intake pipe on the outer side of said housing, suitable ports through said concentric wall and an orifice through said rubbing block permitting passage of the oil to the inner chamber from between said rubbing block and said inner wall, an orifice through the lower end of said collar and adapted to draw the oil from said inner chamber due to centrifugal action and discharge it on said disk where it will overflow at the upper edge in a thin film striking the cap portion of said housing over which it flows downwardly due to gravity and is passed over said cooling coils, part of said oil engaging between the rubbing surfaces without being drawn through said collar orifice.

In testimony whereof I affix my signature in the presence of two witnesses.

ERIC ANTON JACOBSON.

Witnesses:
A. H. ROBERTSON,
WALDON LAWS.